US006970412B2

(12) United States Patent
Katsuma

(10) Patent No.: US 6,970,412 B2
(45) Date of Patent: *Nov. 29, 2005

(54) DIFFRACTION TYPE LENS WHICH CONVERGES TWO WAVELENGTHS OF LIGHT

(75) Inventor: Toshiaki Katsuma, Omiya (JP)

(73) Assignee: Fujinon Corporation, Saitama (JP)

( * ) Notice: Subject to any disclaimer, the term of this patent is extended or adjusted under 35 U.S.C. 154(b) by 426 days.

This patent is subject to a terminal disclaimer.

(21) Appl. No.: 09/808,945

(22) Filed: Mar. 16, 2001

(65) Prior Publication Data

US 2001/0024414 A1   Sep. 27, 2001

(30) Foreign Application Priority Data

Mar. 24, 2000   (JP) .............................. 2000-084487

(51) Int. Cl.[7] ............................ G11B 7/135; G02B 3/10
(52) U.S. Cl. ........................... 369/112.08; 369/112.13; 359/569
(58) Field of Search ...................... 369/112.08, 112.13; 359/569

(56) References Cited

U.S. PATENT DOCUMENTS

| 3,756,695 | A | * | 9/1973 | Mino et al. ................. 359/576 |
| 4,733,943 | A | * | 3/1988 | Suzuki et al. ............... 359/565 |
| 5,695,274 | A | * | 12/1997 | Kamihara et al. .......... 362/268 |
| 5,742,433 | A | * | 4/1998 | Shiono et al. .............. 359/575 |
| 5,995,303 | A | * | 11/1999 | Honguh et al. ............. 359/708 |
| 6,052,353 | A | * | 4/2000 | Fujita .................... 369/112.09 |
| 6,115,345 | A | * | 9/2000 | Kato et al. ............... 369/112.1 |
| 6,130,872 | A | * | 10/2000 | Sugiura et al. ......... 369/112.04 |
| 6,154,278 | A | * | 11/2000 | Ito et al. ...................... 356/499 |
| 6,166,854 | A | * | 12/2000 | Katsuma ..................... 359/569 |
| 6,342,976 | B1 | * | 1/2002 | Nomura et al. ............. 359/722 |
| 6,344,935 | B1 | * | 2/2002 | Maruyama .................. 359/722 |
| 6,545,821 | B2 | * | 4/2003 | Katsuma ..................... 359/721 |

OTHER PUBLICATIONS

Japanese Patent Office, Japanese Unexamined Patent Publication No. 61-287042, Date of Publication: Dec. 17, 1986, Application No.: 60-127619, Filing Date: Jun. 12, 1985, pp. 233-236 (English Language Abstract).

Japanese Patent Office, Japanese Unexamined Patent Publication No. 7-191219, Date of Publication: Jul. 28, 1995, Application No. 5-333522, Filing Date: Dec. 27, 1993, pp. 1-4 (English Language Abstract).

Japanese Patent Office, Japanese Unexamined Patent Publication No. 8-62493, Date of Publication: Mar. 8, 1996, Application No. 7-167211, Date of Filing Jul. 3, 1995, pp. 1-35 (English Language Abstract).

* cited by examiner

Primary Examiner—Gautam R. Patel
(74) Attorney, Agent, or Firm—Snider & Associates; Ronald R. Snider

(57) ABSTRACT

A diffraction type lens in an optical pickup apparatus for recording and reproducing two or more kinds of optical recording media is constituted by a substrate having one surface formed with a zone plate exhibiting a smaller converging action with respect to a wavelength $\lambda_1$ of light and a greater converging action with respect to a wavelength $\lambda_2$ of light, and the other surface formed with a zone plate exhibiting a smaller converging action with respect to the wavelength $\lambda_2$ of light and a greater converging action with respect to the wavelength $\lambda_1$ of light. The substrate is transparent to the wavelengths $\lambda_1$ and $\lambda_2$ of light.

7 Claims, 4 Drawing Sheets

DIFFRACTION TYPE LENS WHICH CONVERGES TWO WAVELENGTHS OF LIGHT

RELATED APPLICATIONS

This application claims the priority of Japanese Patent Application No. 2000-084487 filed on Mar. 24, 2000, which is incorporated herein by reference. Applicant further claims the benefit of U.S. patent application Ser. No. 09/805,226, filed on Mar. 14, 2001, now U.S. Pat. No. 6,545,821.

BACKGROUND OF THE INVENTION

1. Field of the Invention

In an optical pickup apparatus which can be used in common for two or more kinds of optical recording media, the present invention relates to a diffraction type lens which can efficiently converge respective irradiation light beams onto their corresponding optical recording media when the irradiation light beams have respective wavelengths different from each other according to the kinds of optical recording media, and an optical pickup apparatus using the same.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using an optical pickup apparatus has been known.

In such two kinds of optical recording media, for example, visible light at about 635 nm is used for DVD in order to improve the recording density, whereas near-infrared light at about 780 nm is required to be used for CD-R since it has no sensitivity for light in the visible region. An optical pickup apparatus which can be used in common for both of them is based on a dual-wavelength beam type which uses two light beams having wavelengths different from each other.

When the disc thickness value differs between the above-mentioned two kinds of optical recording media, it is necessary for the individual wavelengths of light for reproducing or recording in such an optical pickup apparatus to have converging actions different from each other.

For responding to such a requirement, a system in which two objective lenses having converging actions different from each other are made switchable depending on the optical recording media subjected to reproducing or recording has been known. However, it complicates the structure of optical pickup apparatus and opposes the demands for compactness and lower cost.

On the other hand, while optical pickup apparatus using an optical element shaped like a parallel plate or the like as an objective lens thereof have recently been known (Japanese Unexamined Patent Publication No. 61-287042, No. 8-62493, No. 7-191219, and the like), they fail to satisfy the demands for using two wavelengths of light for reproducing or recording their corresponding optical recording media having disc thickness values different from each other.

SUMMARY OF THE INVENTION

In view of the circumstances mentioned above, it is an object of the present invention to provide a compact, inexpensive diffraction type lens which can converge two wavelengths of light onto their corresponding optical recording media having disc thickness values different from each other, without complicating the structure of optical pickup apparatus.

The present invention provides a diffraction type lens, disposed in a luminous flux, having a wavelength selectivity;

the lens being constituted by a substrate having one surface formed with a zone plate exhibiting a smaller converging action with respect to a wavelength $\lambda_1$ of light and a greater converging action with respect to a wavelength $\lambda_2$ of light, and the other surface formed with a zone plate exhibiting a smaller converging action with respect to the wavelength $\lambda_2$ of light and a greater converging action with respect to the wavelength $\lambda_1$ of light, the substrate being transparent to the wavelengths $\lambda_1$ and $\lambda_2$ of light.

Preferably, the diffraction type lens is shaped like a parallel plate.

Each of the zone plates may comprise concentric gratings each having a rectangular cross section.

Preferably, one surface formed with the zone plate has a height $h_1$ satisfying the following conditional expressions (1) and (2), and the other surface formed with the zone plate has a height $h_2$ satisfying the following conditional expressions (3) and (4):

$$h_1 = L_1 \lambda_1 / (n_1 - 1) \tag{1}$$

$$h_1 = M_1 \lambda_2 / (n_2 - 1) + K_1 \lambda_2 / 2(n_2 - 1) \tag{2}$$

$$h_2 = L_2 \lambda_2 / (n_2 - 1) \tag{3}$$

$$h_2 = M_2 \lambda_2 / (n_1 - 1) + K_2 \lambda_1 / 2(n_1 - 1) \tag{4}$$

where $\lambda_1$ and $\lambda_2$ are the respective wavelengths of two incident light beams;

$n_1$ is the refractive index of a grating portion with respect to the wavelength $\lambda_1$ of light;

$n_2$ is the refractive index of a grating portion with respect to the wavelength $\lambda_2$ of light;

$L_1$ and $L_2$ are positive integers;

$M_1$ is the maximum value among 0 and positive integers satisfying the conditional expression of $h_1 > M_1 \lambda_2/(n_2-1)$;

$M_2$ is the maximum value among 0 and positive integers satisfying the conditional expression of $h_2 > M_2 \lambda_1/(n_1-1)$; and $K_1$ and $K_2$ are values of at least 0.65 but not exceeding 1.35.

The optical pickup apparatus in accordance with the present invention comprises the above-mentioned diffraction type lens, wherein the luminous flux incident on the diffraction type lens is substantially a parallel luminous flux.

Preferably, in the optical pickup apparatus, the luminous flux is converged at a position where two kinds of optical recording media having thickness values different from each other are disposed, the wavelength $\lambda_1$ of light being used for recording or reproducing one optical recording medium, the wavelength $\lambda_2$ of light being used for recording or reproducing the other optical recording medium.

DESCRIPTION OF THE PREFERRED EMBODIMENTS

In the following, embodiments of the present invention will be explained with reference to the drawings.

Figure 6:
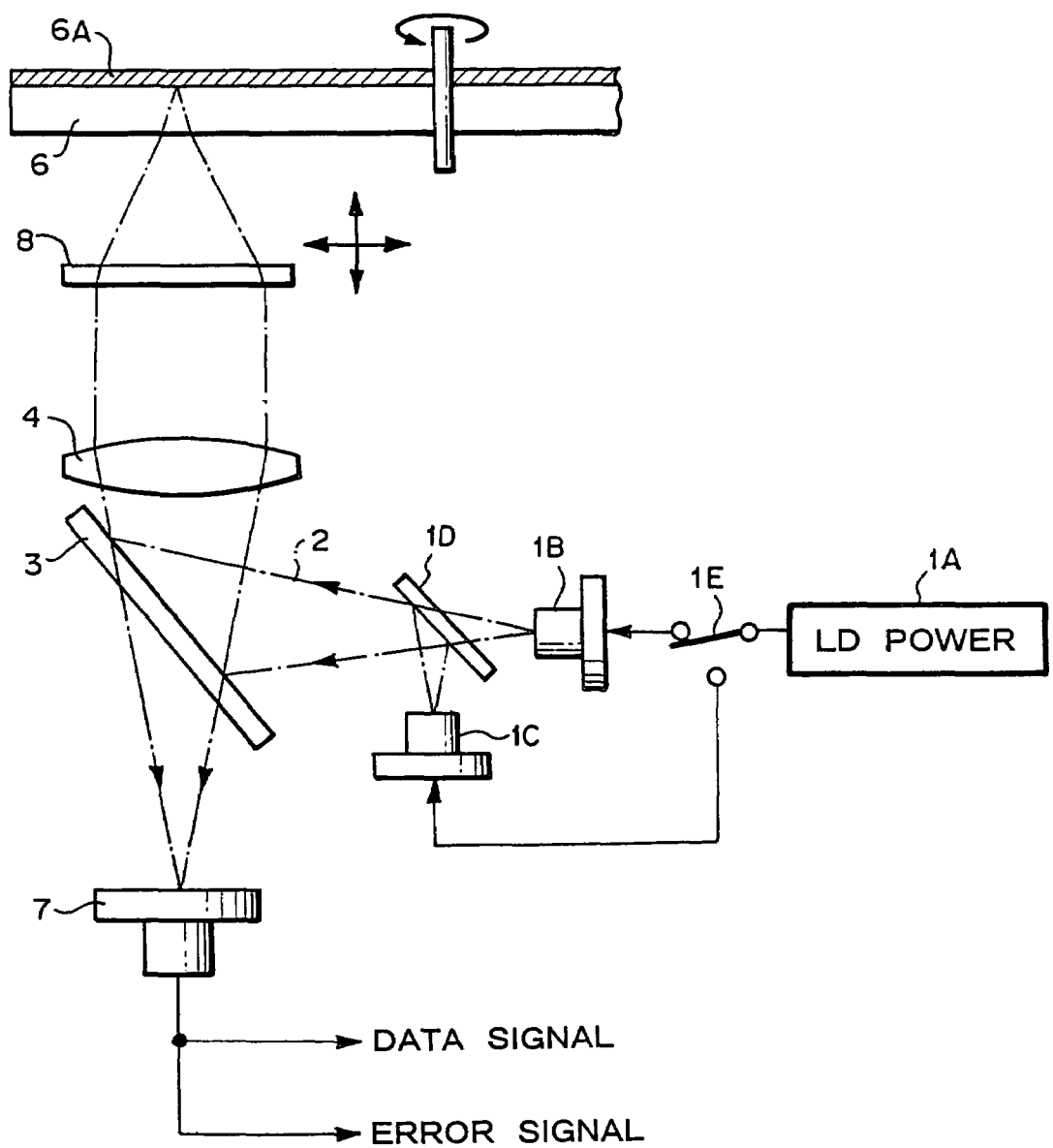
FIG. 6 is a schematic view showing the optical pickup apparatus in accordance with an embodiment of the present invention.

First, with reference to FIG. 6, the optical pickup apparatus using the diffraction type lens in accordance with an embodiment of the present invention will be explained.

In this optical pickup apparatus, a semiconductor laser 1B, 1C outputs a laser beam 2 when power is supplied thereto from an LD power source 1A, a collimator lens 4 turns the laser beam 2 into parallel light, and a diffraction type lens 8 functioning as an objective lens converts the parallel light into convergent light, with which a recording region 6A of an optical disc 6 is irradiated. The semiconductor laser 1B is a light source for outputting a laser beam in a near-infrared region having a wavelength of 780 nm for CD-R (recordable optical disc), whereas the semiconductor laser 1C is a light source for outputting a laser beam, for example, in a visible light having a wavelength of 635 nm for DVD (digital versatile disc). The laser beam 2 outputted from one of the semiconductor lasers 1B, 1C irradiates the half mirror 3 by way of a half mirror 1D. A changeover switch 1E is disposed between the LD power source 1A and the semiconductor lasers 1B, 1C. As the changeover switch 1E is operated, power is supplied to one of the semiconductor lasers 1B, 1C.

In the recording region 6A, pits carrying signal information are arranged in a track. The reflected light of laser beam 2 used for reproducing the recording information from region 6A is made incident on the half mirror 3 by way of the diffraction type lens 8 and the collimator lens 4 while carrying the signal information, and is transmitted through the half mirror 3, so as to be made incident on a four-part photodiode 7. The respective quantities of light received at the four-part photodiode 7 are arithmetically operated, whereby data signals and respective error signals for focusing and tracking are obtained.

Since the half mirror 3 is inserted in the optical path of the return light from the optical disc 6 in a state tilted by 45°, it acts like a cylindrical lens, so that the light beam transmitted through the half mirror 3 has an astigmatism, whereby the amount of focusing error is determined according to the form of the beam spot of return light on the four-part photodiode 7. Here, the collimator lens 4 can be omitted depending on the circumstances. Also, a diffraction grating may be inserted between the semiconductor lasers 1B, 1C and the half mirror 3, such that tracking errors can be detected by use of three beams.

This optical pickup apparatus is configured such that signals can be recorded and reproduced for any optical disc 6 of CD-R and DVD.

Here, each of the CD-R and DVD has a protective sheet made of PC (polycarbonate; refractive index $n_D$=1.514).

Meanwhile, the geometric thickness of CD-R is standardized at 1.2 mm, whereas that of DVD is substantially standardized at 0.6 mm. For securely carrying out focusing on each optical disc 6, it is necessary to provide a configuration yielding focusing actions different from each other for the respective wavelengths of light for recording/reproducing the different kinds of discs.

Figure 1:
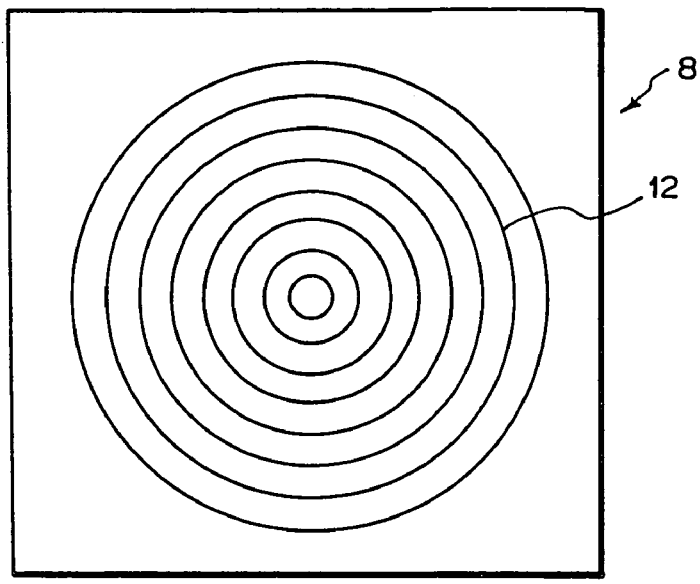
FIG. 1 is a plan view showing the diffraction type lens in accordance with an embodiment of the present invention.
Figure 2A:
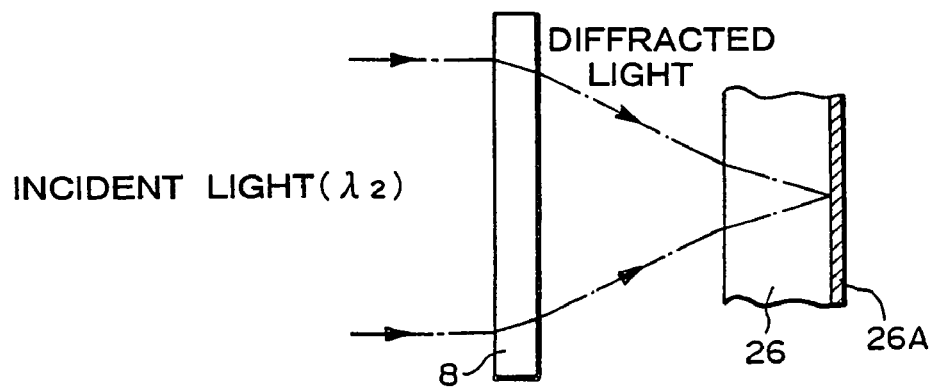
FIGS. 2A and 2B are schematic views for explaining operations of the diffraction type lens shown in FIG. 1.

Therefore, as shown in FIG. 1, the front and back faces of the diffraction type lens 8 in this optical pickup apparatus are provided with respective zone plates 12 having wavelength selectivity characteristics and converging actions different from each other, such that both CD-R and DVD can be recorded and reproduced. When a CD-R 26 is disposed at a predetermined position (on a turntable) as shown in FIG. 2A for recording or reproducing, the laser beam 2 having a wavelength of 780 nm ($\lambda_2$) from the semiconductor laser 1B is made incident on the diffraction type lens 8 while in a substantially parallel light state. In this case, the incident laser beam 2 is converged onto a recording surface 26A of the CD-R 26 by the zone plate 12 formed on the surface (hereinafter referred to as second surface) of diffraction type lens 8 on the light source side.

The zone plate 12 formed on the second surface has no converging action (i.e., yields 100% of zero-order diffracted light) for the laser beam 2 having a wavelength of 635 nm ($\lambda_1$), whereby this laser beam 2 passes through the second surface substantially as it is.

Figure 2B:
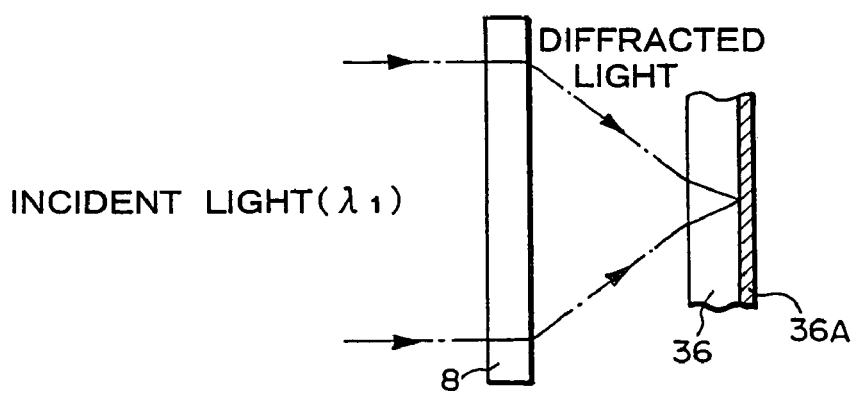

When a DVD 36 is disposed at a predetermined position (on the turntable) as shown in FIG. 2B for recording or reproducing, the laser beam 2 having a wavelength of 635 nm ($\lambda_1$) from the semiconductor laser 1C is made incident on the diffraction type lens 8 while in a substantially parallel light state. In this case, the incident laser beam 2 is converged onto a recording surface 36A of the DVD 36 by the zone plate 12 formed on the surface (hereinafter referred to as first surface) of diffraction type lens 8 on the disc side.

The zone plate 12 formed on the first surface has no converging action (i.e., yields 100% of zero-order diffracted light) for the laser beam 2 having a wavelength of 780 nm ($\lambda_2$), whereby this laser beam 2 passes through the first surface substantially as it is.

Figure 3:
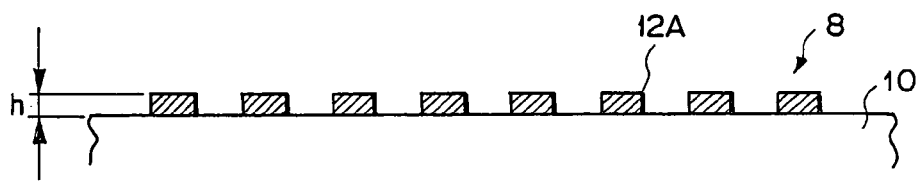
FIG. 3 is a partial sectional view showing the form of the diffraction type lens shown in FIG. 1.

FIG. 3 shows the cross-sectional structure of the first surface of diffraction type lens 8, illustrating the state where a zone plate 12A having a rectangular cross section is formed on a glass substrate 10.

The second surface is formed with a zone plate 12B having substantially the similar shape (whose height and pitch differ from those of the zone plate 12A as will be explained later).

Specific grating pitches of the zone plates 12A, 12B are determined in view of the NA values of lens required for DVD and CD-R.

The thickness (height) values $h_1$, $h_2$ of the zone plates 12A, 12B are set such that the ratio of first-order diffracted light for their corresponding wavelengths of light becomes greater, whereas the ratio of zero-order diffracted light for the other wavelengths of light becomes 100%.

Namely, they satisfy the following conditional expressions (1) to (4):

$$h_1 = L_1 \lambda_1 / (n_1 - 1) \tag{1}$$

$$h_1 = M_1 \lambda_2 / (n_2 - 1) + K_1 \lambda_2 / 2(n_2 - 1) \tag{2}$$

$$h_2 = L_2\lambda_2/(n_2-1) \quad (3)$$

$$h_2 = M_2\lambda_1/(n_1-1) + K_2\lambda_1/2(n_1-1) \quad (4)$$

where $\lambda_1$ and $\lambda_2$ are the respective wavelengths of two incident light beams;

$n_1$ is the refractive index of a grating portion with respect to the wavelength $\lambda_1$ of light;

$n_2$ is the refractive index of a grating portion with respect to the wavelength $\lambda_2$ of light;

$L_1$ and $L_2$ are positive integers;

$M_1$ is the maximum value among 0 and positive integers satisfying the conditional expression of $h_1 > M_1\lambda_2/(n_2-1)$;

$M_2$ is the maximum value among 0 and positive integers satisfying the conditional expression of $h_2 > M_2\lambda_1/(n_1-1)$; and $K_1$ and $K_2$ are values of at least 0.65 but not exceeding 1.35.

The above-mentioned conditional expressions define conditions which can make the diffraction efficiency of first-order diffracted light greater with respect to each corresponding wavelength of light, while yielding a diffraction efficiency of 100% for the zero-order diffracted light with respect to the other wavelength of light.

In the above-mentioned conditional expressions (2), (4), the diffraction efficiency of zero-order diffracted light becomes smaller as the value of $K_1$, $K_2$ (collectively referred to as K) approaches 1.0, such that the diffraction efficiency of zero-order diffracted light becomes 0 when K=1.0.

Figure 7:
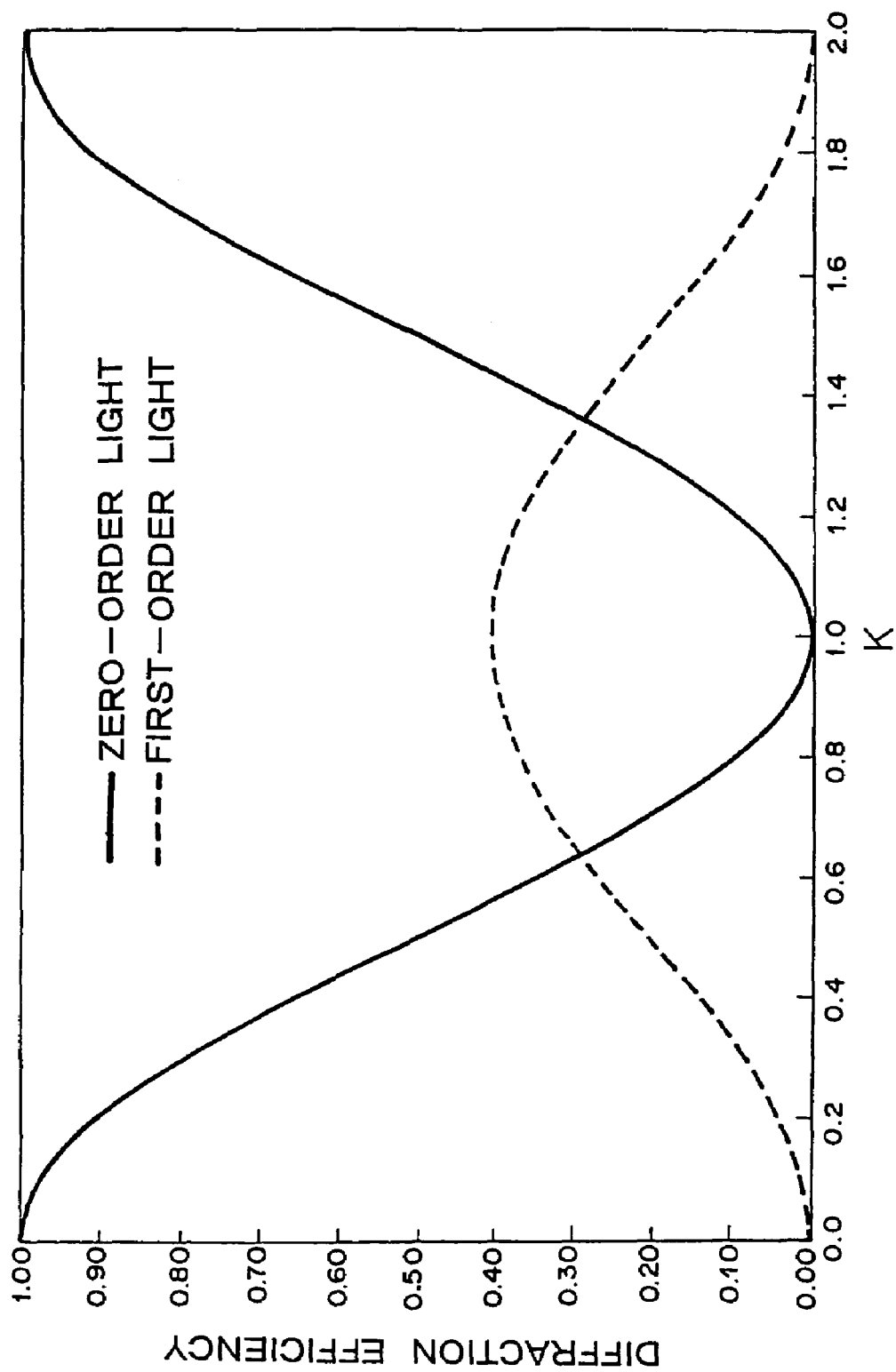
FIG. 7 is a graph showing the diffraction efficiency of a zone plate in the diffraction type lens in accordance with an embodiment of the present invention.

FIG. 7 shows how the ratios of zero-order diffracted light and first-order diffracted light change according to the value of K when the above-mentioned conditional expressions (2), (4) are used, indicating that the ratio of first-order diffracted light is not lower than that of zero-order diffracted light, i.e., the converging action becomes greater, within the range of $0.65 \leq K \leq 1.35$.

Each of the zone plates 12A, 12B is formed by vapor deposition of titanium dioxide ($TiO_2$) onto a glass substrate 10. The refractive index of titanium dioxide is 2.349 for light having a wavelength of 635 nm, and 2.299 for light having a wavelength of 780 nm.

Figure 4:
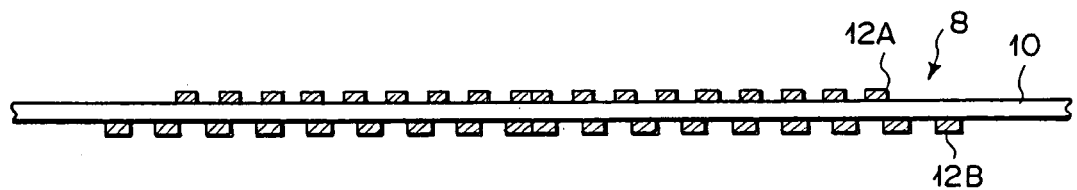
FIG. 4 is a sectional view showing the form of the diffraction type lens in accordance with an embodiment of the present invention.
Figure 5:
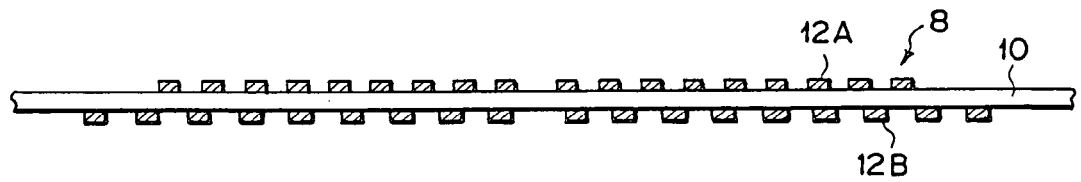
FIG. 5 is a sectional view showing the form of the diffraction type lens in accordance with an embodiment different from that shown in FIG. 4.

FIGS. 4 and 5 show different embodiments of the above-mentioned diffraction type lens 8, respectively. Each embodiment can yield similar operations and effects.

The outermost diameters of the zone plates 12A, 12B may be set in view of the beam diameters of two wavelengths of incident laser beams 2. Which outermost diameter is larger or smaller can be set as appropriate.

The diffraction type lens of the present invention can be modified in various manners without being restricted to the above-mentioned embodiments. For example, plastic materials can be used as a material for forming a substrate, whereas various other kinds of materials such as metals, metal oxides, and nonmetals can be used as a material for forming a zone plate. The substrate and zone plates may integrally be formed from plastics as well.

The technique for forming the zone plates is not restricted to vapor deposition, whereas various techniques such as sputtering, plating, and roll-coating can be used.

The recording media used for recording and reproducing in the optical pickup apparatus are not limited to DVD and CD-R. The present invention is applicable to cases where two kinds of optical recording media whose specifications of wavelength regions to be used differ from each other are subjected to recording and reproducing in the same optical pickup apparatus.

The values of $L_1$, $L_2$ in the above-mentioned conditional expressions (1), (3) may be set to values different from integers within a practically unproblematic range, such that the values of $K_1$, $K_2$ are set so as to become at least 0.65 but not exceeding 1.35.

Substantially similar operations and effects can also be obtained when the zone plates formed in the above-mentioned first and second surfaces are interchanged therebetween.

EXAMPLES

In the following, the diffraction type lens in accordance with the present invention will further be explained with reference to Examples using specific values.

Example 1

The material for forming zone plates was titanium dioxide ($TiO_2$), the wavelength $\lambda_1$ of light irradiating DVD was 635 nm, and the wavelength $\lambda_2$ of light irradiating CD-R was 780 nm. As a consequence, titanium dioxide exhibited a refractive index $n_1$ of 2.349 for the wavelength $\lambda_1$ of light, and a refractive index $n_2$ of 2.299 for the wavelength $\lambda_2$ of light. When $L_1=2$ and $L_2=2$ in the above-mentioned conditional expressions (1) and (3), the heights $h_1$ and $h_2$ of zone plates became 0.94144 μm and 1.20092 μm, respectively.

In this case, $M_1=1$ and $K_1=1.136$ in the above-mentioned conditional expression (2), whereas $M_2=2$ and $K_2=1.103$ in the above-mentioned conditional expression (4).

Here, the diffraction efficiency of the zone plate on the disc side (first surface side) was such that the respective ratios of zero-order diffracted light and first-order diffracted light were 2.6% and 39.5% for the wavelength of 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and first-order diffracted light were 4.5% and 38.7% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 2

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1=3$ and $L_2=5$ were set in the above-mentioned conditional expressions (1) and (3), respectively. As a consequence, the heights $h_1$ and $h_2$ of zone plates became 1.41216 μm and 3.00231 μm, respectively.

In this case, $M_1=2$ and $K_1=0.704$ in the above-mentioned conditional expression (2), whereas $M_2=6$ and $K_2=0.756$ in the above-mentioned conditional expression (4).

Here, the diffraction efficiency of the zone plate on the disc side (first surface side) was such that the respective ratios of zero-order diffracted light and first-order diffracted light were 14.0% and 34.9% for the wavelength 635 nm ($\lambda_1$)

of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and first-order diffracted light were 20.2% and 32.4% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

Example 3

While the material for forming zone plates, the wavelength $\lambda_1$ of light irradiating DVD, the wavelength $\lambda_2$ of light irradiating CD-R, and the refractive indices $n_1$, $n_2$ for the material were identical to those in Example 1, $L_1$=11 and $L_2$= 6 were set in the above-mentioned conditional expressions (1) and (3), respectively. As a consequence, the heights $h_1$ and $h_2$ of zone plates became 5.17791 $\mu$m and 3.60277 $\mu$m, respectively.

In this case, $M_1$=8 and $K_1$=1.246 in the above-mentioned conditional expression (2), whereas $M_2$=7 and $K_2$=1.308 in the above-mentioned conditional expression (4).

Here, the diffraction efficiency of the zone plate on the disc side (first surface side) was such that the respective ratios of zero-order diffracted light and first-order diffracted light were 21.6% and 31.8% for the wavelength 635 nm ($\lambda_1$) of light, whereas the ratio of zero-order diffracted light was 100% for the wavelength 780 nm ($\lambda_2$) of light.

On the other hand, the diffraction efficiency of the zone plate on the light source side (second surface side) was such that the ratio of zero-order diffracted light was 100% for the wavelength 635 nm ($\lambda_1$) of light, whereas the respective ratios of zero-order diffracted light and first-order diffracted light were 14.3% and 34.8% for the wavelength 780 nm ($\lambda_2$) of light.

Therefore, the zone plate on the disc side (first surface side) exhibited a converging lens action for the wavelength 635 nm ($\lambda_1$) of light, whereas the zone plate on the light source side (second surface side) exhibited a converging lens action for the wavelength 780 nm ($\lambda_2$) of light.

As explained in the foregoing, since front and back faces of a lens are provided with respective zone plates having wavelength selectivity characteristics and converging actions different from each other, the diffraction type lens and optical pickup apparatus of the present invention enable the zone plate on the front face side to converge the light having a wavelength for reproducing or recording one optical recording medium, and the zone plate on the back face side to converge the light having a wavelength for reproducing or recording the other optical recording medium.

Also, since the lens can be made thin, a sufficient working distance for focusing can be attained without yielding a long focal length.

Therefore, two wavelengths of light can be converged into recording surfaces of their corresponding optical recording media having disc thickness values different from each other, while satisfying demands for compactness and lower cost without complicating the structure of optical pickup apparatus.

What is claimed is:

1. A diffraction type lens, disposed in a luminous flux, having a wavelength selectivity;
said lens having a positive refractive power being constituted by a substrate having one surface formed with a zone plate exhibiting a smaller converging action with respect to a wavelength $\lambda_1$ of light and a greater converging action with respect to a wavelength $\lambda_2$ of light, and the other surface formed with a zone plate exhibiting a smaller converging action with respect to said wavelength $\lambda_2$ of light and a greater converging action with respect to said wavelength $\lambda_1$ of light, said substrate being transparent to said wavelengths $\lambda_1$ and $\lambda_2$ of light, wherein each of said zone plates comprises concentric gratings each having a rectangular cross section.

2. A diffraction type lens according to claim 1, wherein said diffraction type lens is shaped like a parallel plate.

3. A diffraction type lens according to claim 1, wherein said one surface formed with the zone plate has a height $h_1$ satisfying the following conditional expressions (1) and (2), and said the other surface formed with the zone plate has a height $h_2$ satisfying the following conditional expressions (3) and (4):

$$h_1=L_1\lambda_1/(n_1-1) \quad (1)$$

$$h_1=M_1\lambda_2/(n_2-1)+K_1\lambda_2/2(n_2-1) \quad (2)$$

$$h_2=L_2\lambda_2/(n_2-1) \quad (3)$$

$$h_2=M_2\lambda_1/(n_1-1)+K_2\lambda_1/2(n_1-1) \quad (4)$$

where
$\lambda_1$ and $\lambda_2$ are the respective wavelengths of two incident light beams;
$n_1$ is the refractive index of a grating portion with respect to the wavelength $\lambda_1$ of light;
$n_2$ is the refractive index of a grating portion with respect to the wavelength $\lambda_2$ of light;
$L_1$ and $L_2$ are positive integers;
$M_1$ is the maximum value among 0 and positive integers satisfying the conditional expression of $h_1 > M_1\lambda_2/(n_2-1)$;
$M_2$ is the maximum value among 0 and positive integers satisfying the conditional expression of $h_2 > M_2\lambda_1/(n_1-1)$; and
$K_1$ and $K_2$ are values of at least 0.65 but not exceeding 1.35.

4. A diffraction type lens according to claim 1, disposed in a luminous flux, having a wavelength selectivity;
wherein said luminous flux incident on said diffraction type lens is substantially a parallel luminous flux.

5. An optical pickup apparatus according to claim 4, wherein said luminous flux is converged at a position where two kinds of optical recording media having thickness values different from each other are disposed, said wavelength $\lambda_1$ of light being used for recording or reproducing one optical recording medium, said wavelength $\lambda_2$ of light being used for recording or reproducing the other optical recording medium.

6. A diffraction type lens according to claim 1, disposed in a luminous flux, having a wavelength selectivity;
wherein luminous flux irradiated on a recording surface from said lens and received from said recording surface have optical paths which are in substantial agreement.

7. A diffraction type lens according to claim 1, disposed in a luminous flux, having a wavelength selectivity;
wherein when a luminous flux is irradiated on said lens, the lens is driven for focusing.

* * * * *